United States Patent [19]
Wheeler

[11] Patent Number: 5,090,760
[45] Date of Patent: Feb. 25, 1992

[54] BREAK-AWAY GAS FILL GUARD

[76] Inventor: Basil W. Wheeler, Rte. 9, Box 18-D, Athens, Ala. 35611

[21] Appl. No.: 471,625

[22] Filed: Jan. 29, 1990

[51] Int. Cl.⁵ .......................................... B60R 27/00
[52] U.S. Cl. .................................. 296/1.1; 285/200; 296/97.22; 280/834; 220/86.1
[58] Field of Search .................... 296/97.22, 1.1; 280/834, 853; 220/85 F; 248/222.2, 222.3; 24/514, 569; 285/200, 224, 225

[56] References Cited

U.S. PATENT DOCUMENTS

| | | | |
|---|---|---|---|
| 2,441,009 | 5/1948 | Cunningham | 285/200 |
| 2,757,025 | 7/1956 | Noyes et al. | 285/200 |
| 2,856,316 | 12/1974 | Baoberg | 280/834 |
| 4,079,952 | 3/1978 | Nishio et al. | 280/834 |
| 4,142,756 | 3/1979 | Henning et al. | 296/97.22 |
| 4,448,323 | 5/1984 | Hayashi et al. | 280/834 X |
| 4,573,694 | 3/1986 | Goto et al. | 280/834 |

FOREIGN PATENT DOCUMENTS

| | | | |
|---|---|---|---|
| 0001026 | 1/1985 | Japan | 296/97.22 |
| 0082823 | 4/1988 | Japan | 296/97.22 |
| 0067420 | 3/1989 | Japan | 280/834 |

Primary Examiner—Dennis H. Pedder
Attorney, Agent, or Firm—John C. Garvin, Jr.; James E. Staudt

[57] ABSTRACT

An assembly for flexibly securing the fuel filler pipe of a vehicle to the body of the vehicle. The assembly includes a flexible support member which is designed to provide a "break-away" connection to a housing which is attached rigidly to the body of the vehicle. Thus, in the event that the vehicle is involved in an accident, the filler pipe connector is permitted to move relative to the body thereby reducing the chance of breakage between the fuel filler pipe and the fuel tank of the vehicle. In addition a rigid connector plate is rigidly attached to the fuel filler pipe. This connector plate serves to connect the filler pipe to the flexible support member and in the event of an accident, it serves to protect the open end area of the filler pipe so as to reduce the chance of damage thereto, and also serves to lessen the change of damage or disengagement of a fuel cap attached to the filler pipe.

15 Claims, 5 Drawing Sheets

BREAK-AWAY GAS FILL GUARD

BACKGROUND OF THE INVENTION

Vehicular accidents claim thousands of lives each year. Studies have shown that many of these fatalities included persons who were not seriously injured in the accident but were killed or seriously injured by fire which followed the initial impact. The principal causes of this type of fire include the rupture of the vehicle's fuel tank or the disengagement of the filler cap which is attached to the open end of the fuel filler pipe. Many of these ruptures occur as a result of the fuel tank's filler pipe being broken away from the body of the tank. As a vehicle is impacted the body of the vehicle is often moved relative to the fuel tank. Since the upper portion of a fuel tank's filler pipe is normally attached to the body of the vehicle in such a way as to prevent such relative movement, the obvious result is an over stressing and consequent rupture of the connection between the filler pipe and the body of the fuel tank. Disengagement of the filler pipe cap is normally caused by the cap being impacted by a body portion of the vehicle.

Accordingly, in general, it is an object of the present invention to lessen the chance of fuel spillage from the area of a vehicle's fuel filler pipe. The device which is the subject of this invention is particularly well adapted for use on van type vehicles, such as those which are used as emergency vehicles, or are subject to severe usage, but is also well suited for use on all types of motorized vehicles.

More specifically, it is an object of the present invention to provide a resilient break-away connection assembly for attachment between the body of a vehicle and the filler pipe of the vehicle's fuel tank. This assembly provides a particularly effective support to the filler pipe during normal use, and is specifically designed to reduce the chance of a rupture between the vehicle's fuel tank and its filler pipe, in the event that the vehicle is involved in an accident.

Another object of the present invention is to provide a fuel filler pipe connection assembly which utilizes a portion of the assembly to serve as a connector element during normal operation of the vehicle and as a protector to the open end portion of a vehicle fuel filler pipe so as to minimize the chance of disengagement of a fuel filler cap in the event the vehicle is involved in an accident.

Yet another object of the invention is to provide a resilient break-away connector assembly which provides an effective support between the body of a vehicle and its fuel filler pipe and which serves to absorb severe vibrations between the vehicle's body and fuel tank. The assembly thus serves to minimize stress and resultant cracking at the point of connection between the vehicle's fuel filler pipe and its fuel tank.

Yet another object of the invention is to provide a resilient break-away connector which, because of its unique design, allows a great deal of multi-directional movement between a vehicle body and its fuel filler pipe without the exertion of undue stress on the area of connection between a vehicle's fuel tank filler pipe and its fuel tank.

Still another object of the invention is to provide a resilient break-away connector assembly which is inexpensive to fabricate and which is easily utilized to provide a safe and efficient connection between the body of a vehicle and its fuel filler pipe.

Yet another object of the invention is to provide a flexible connector assembly which will accommodate filler pipes of varying sizes and configurations.

Further objects, features, and advantages of the present invention will be readily apparent from the description which follows.

Examples of related prior art include U.S. Pat. Nos. as follows: Farlli, Pat. No. 4,027,910; Nishio et al, Pat. No. 4,079,952; Henning et al, Pat. No. 4,142,756; Hubbard et al, Pat. No. 4,185,844; Kudo, Pat. No. 4,252,245; Hazashi et al, Pat. No. 4,448,323; and Goto et al Pat. No. 4,573,694.

While the referenced prior art patents disclose devices which seek to resolve at least some of the problems associated with accidental fuel spills caused by vehicle impact, none suggest a device having the flexibility and safety features which are present in the unique assembly disclosed by applicant.

SUMMARY OF THE INVENTION

A resilient break-away connector assembly is attached to the body of a vehicle and to the filler pipe of the vehicle's fuel tank to reduce undue stress in the area of connection between the vehicle's fuel tank and its filler pipe in the event of the vehicle being involved in a collision or any type accident wherein the vehicle is impacted.

The assembly features a resilient support element which incorporates a large strategically located convolution which greatly enhances the flexibility of the connection between the body of a vehicle and its fuel filler pipe.

The assembly also includes a rigid plate for attachment of the filler pipe to the resilient portion of the connector assembly. This plate is sized proportionally larger than the filler pipe and is located in close proximity to the open end of the filler pipe so as to provide protection to the open end portion of the pipe and to a fuel cap attached thereto.

Further, the connector is designed to accommodate filler pipes of varying diameters and configurations, and serves to reduce vibrational stress in the area of connection between a vehicle's fuel tank and its filler pipe during operation in rough terrain. In addition, the flexible portion of the connector is formed of a fuel resistent material which prevents corrosion between the body of the vehicle and the filler pipe of the vehicle's fuel tank.

DESCRIPTION OF THE PREFERRED EMBODIMENT

Figure 1:
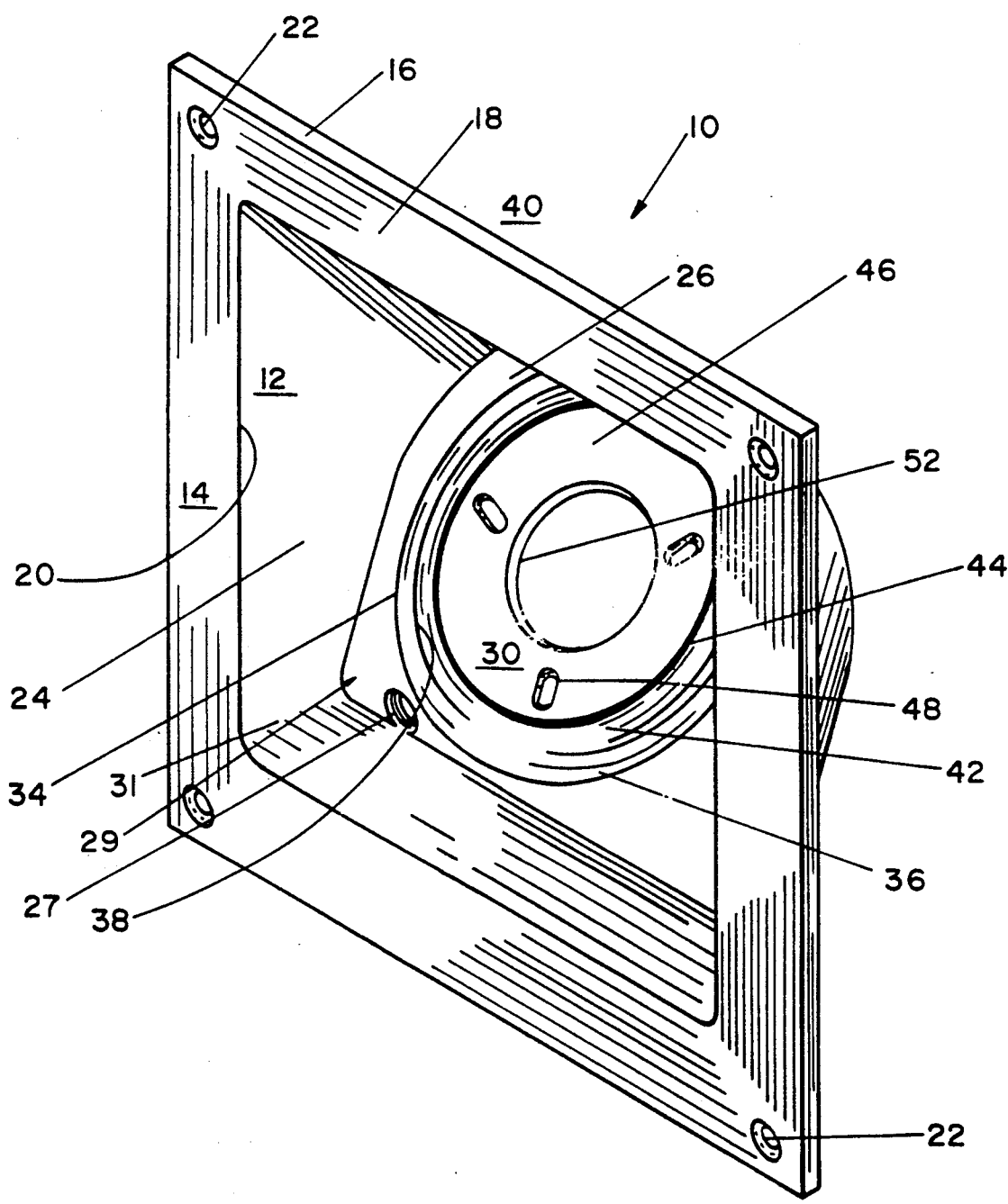
FIG. 1 is a perspective view of a break-away gas fill guard assembly which embodies the present invention.
Figure 2:
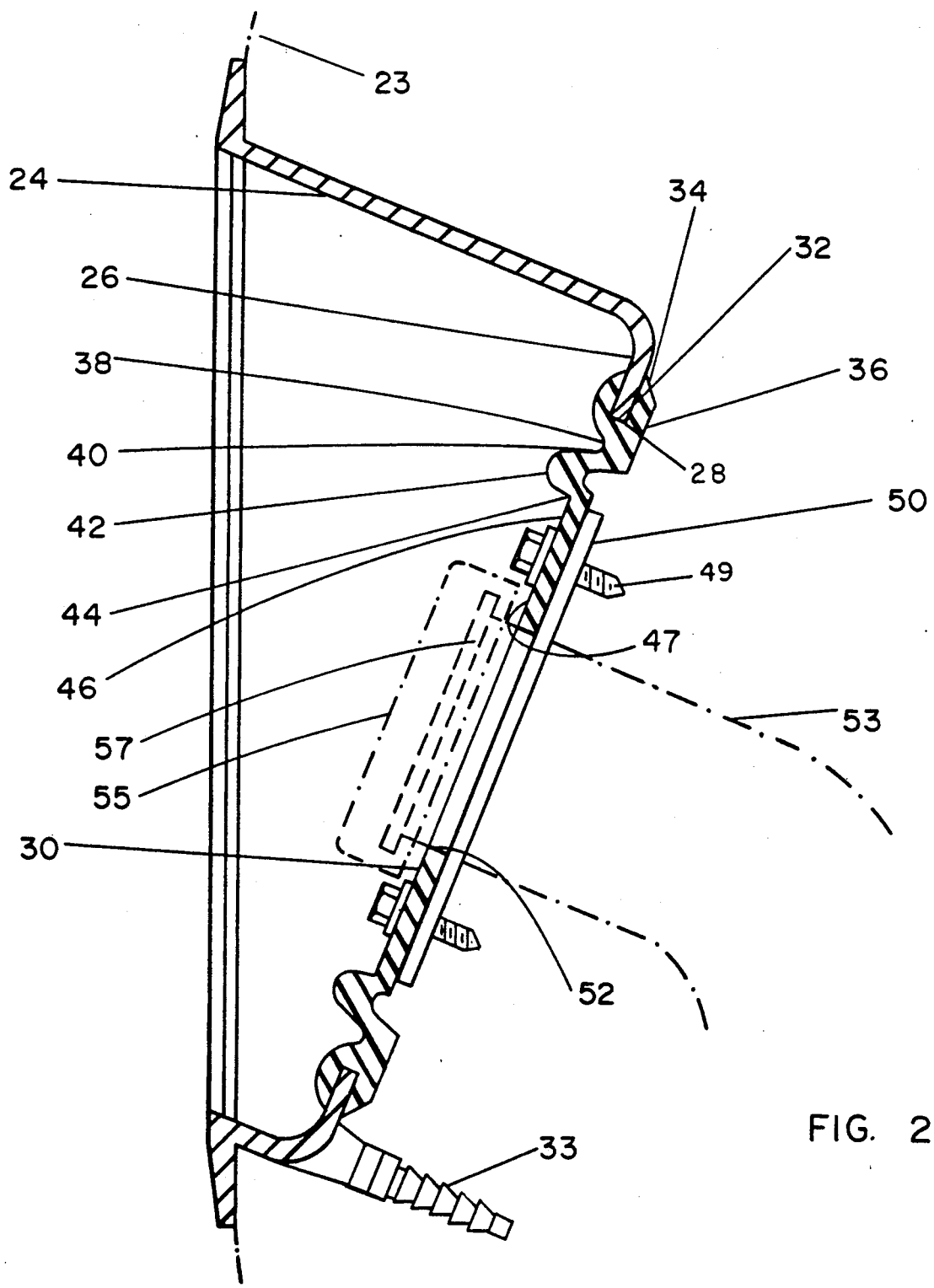
FIG. 2 is a side sectional view of the embodiment of the invention as illustrated in FIG. 1 and illustrates in phantom its association with various parts of a vehicle.

Referring now to FIG. 1, a break-away gas fill guard and connector assembly is illustrated generally by the numeral 10. More specifically, the assembly includes an attachment housing 12 which in turn includes a frame 14 having an outer portion 16, an intermediate portion 18 and an inner portion 20. The housing 12 is formed of cast aluminum or like material. Intermediate portion 18 of frame 14 is provided with mounting holes 22 at each corner thereof. Holes 22 are provided to receive fasteners (not shown) such as bolts or screws for mounting the assembly 10 to the body 23 of a vehicle which is shown in phantom in FIG. 2. Extending laterally inwardly from the inner portion 20 of frame 14 and integral therewith is a receptacle cup 24 which terminates in a flattened portion 26 which includes an opening 28 therein. A smaller drain opening 27 is positioned in a lower surface 29 of flattened portion 26 to drain spilled gas (which may have spilled during a filling operation) from the housing. The threaded drain opening 27 is illustrated as being located adjacent a corner 31 of the housing and a drain connector 33 (FIG. 2) is threadably secured in the opening 27 and is disposed to have a drain hose (not shown) connected thereto. Removably secured in opening 28 is a flexible support member 30 which is formed of a fuel resistent rubber or like material As best illustrated in FIG. 2, support member 30 is secured to the flattened portion 26 of receptacle cup 24 by means of a groove 32, which is formed in the outer edge 34 of an enlarged peripheral ring 36. This groove serves to provide the critical "break-away" connection to housing 12. The inner portion 38 of peripheral ring 36 is integral with the outer portion 40 of a flexible convolution 42, the inner portion 44 of which is integral with a connector disk 46. The connector disk 46 is provided with holes 48 for reception of fasteners 49 for attachment of the connector disk 46 to a connector plate 50 as illustrated in FIG. 2. Holes 48 are shown as oblong, but they may be other than oblong such as round or circular. Connector disk 46 is also provided with an opening 52 for reception of the fuel filler pipe 53 of a vehicle's fuel tank. The filler pipe and its fuel cap 55 are shown in phantom in FIG. 2. The flexibility of the material utilized throughout the flexible support member 30 permits the use of filler pipes of considerably larger diameter than that of the opening 52.

It will be noted that the configuration of the flexible convolution 42 permits a great deal of multi-directional movement of a vehicle's fuel filler pipe relative to the attachment housing 12. This movement aids in preventing over stressing and resultant rupture at the connection point of the vehicle even under most severe use.

Of particular interest is the location and configuration of the connector plate 50. It will be noted that the plate is rigid and is rigidly attached in close proximity to the end portion of the fuel filler pipe 53 and its fuel cap 55. Plate 50 in addition to its function as a connector to the flexible support member 30 is designed to provide protection to the open end portion 57 of the filler pipe 53 and particularly the fuel cap 55 attached thereto. In order to provide such protection the plate 50 is provided with a diameter larger than that of the filler pipe 53 and a typical cap 55. Studies have shown that a diameter of at least one third larger than that of the filler pipe are required to provide adequate protection.

As previously mentioned, the convolution 40 of the flexible member 30 is designed o provide adequate support to a fuel filler pipe 53 under the most severe operating conditions and yet provide a great deal of multi-directional movement before disengagement of its grooved, edge 32 from the housing 12. Thus, this convolution design provides the increased flexibility required to maintain connection between the filler pipe 53 and the housing 12 during use of the vehicle under severe off road conditions such as are often encountered by emergency vehicles.

Figure 3:
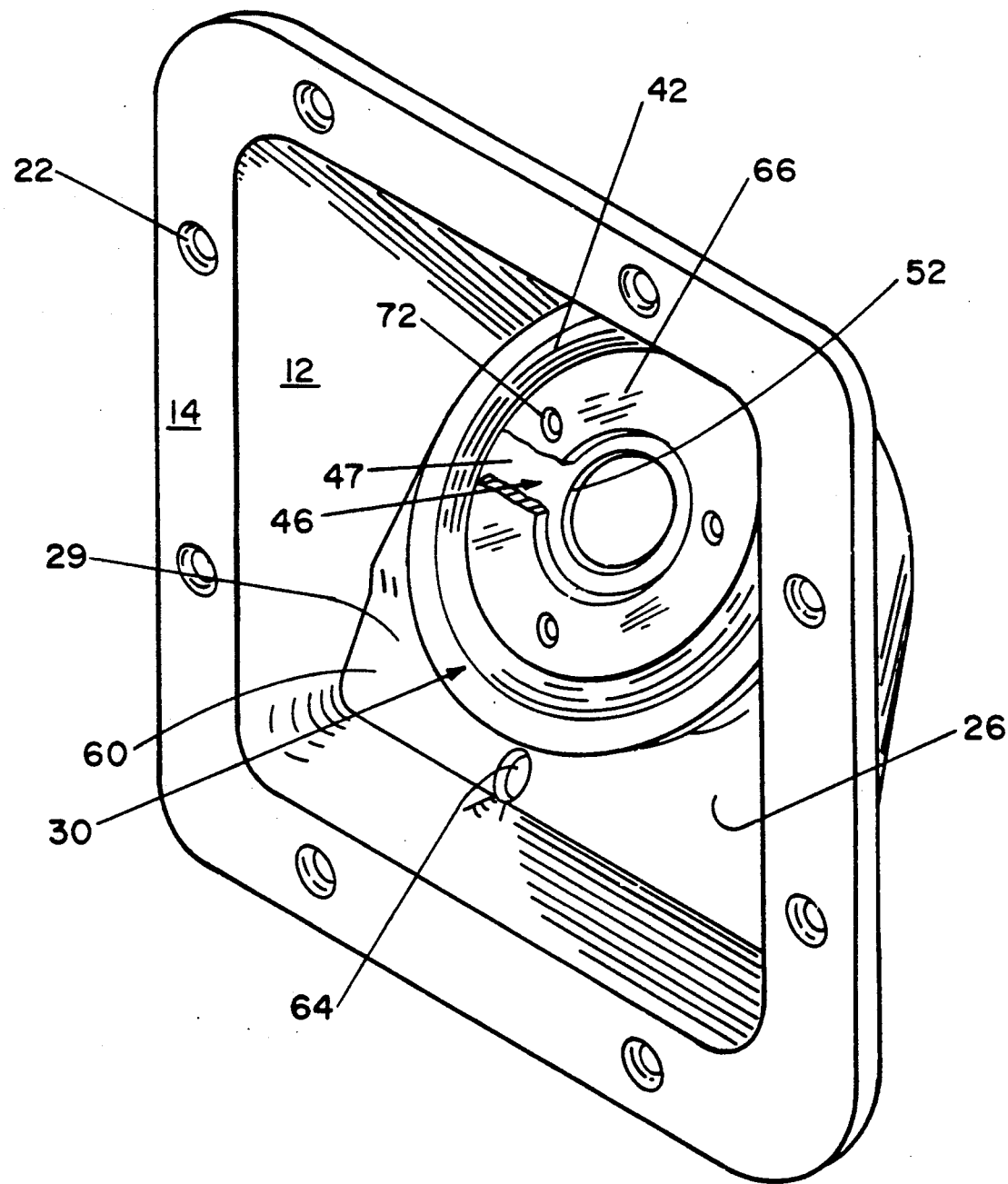
FIG. 3 is a view similar to FIG. 1 illustrating another embodiment of the present invention.
Figure 4:
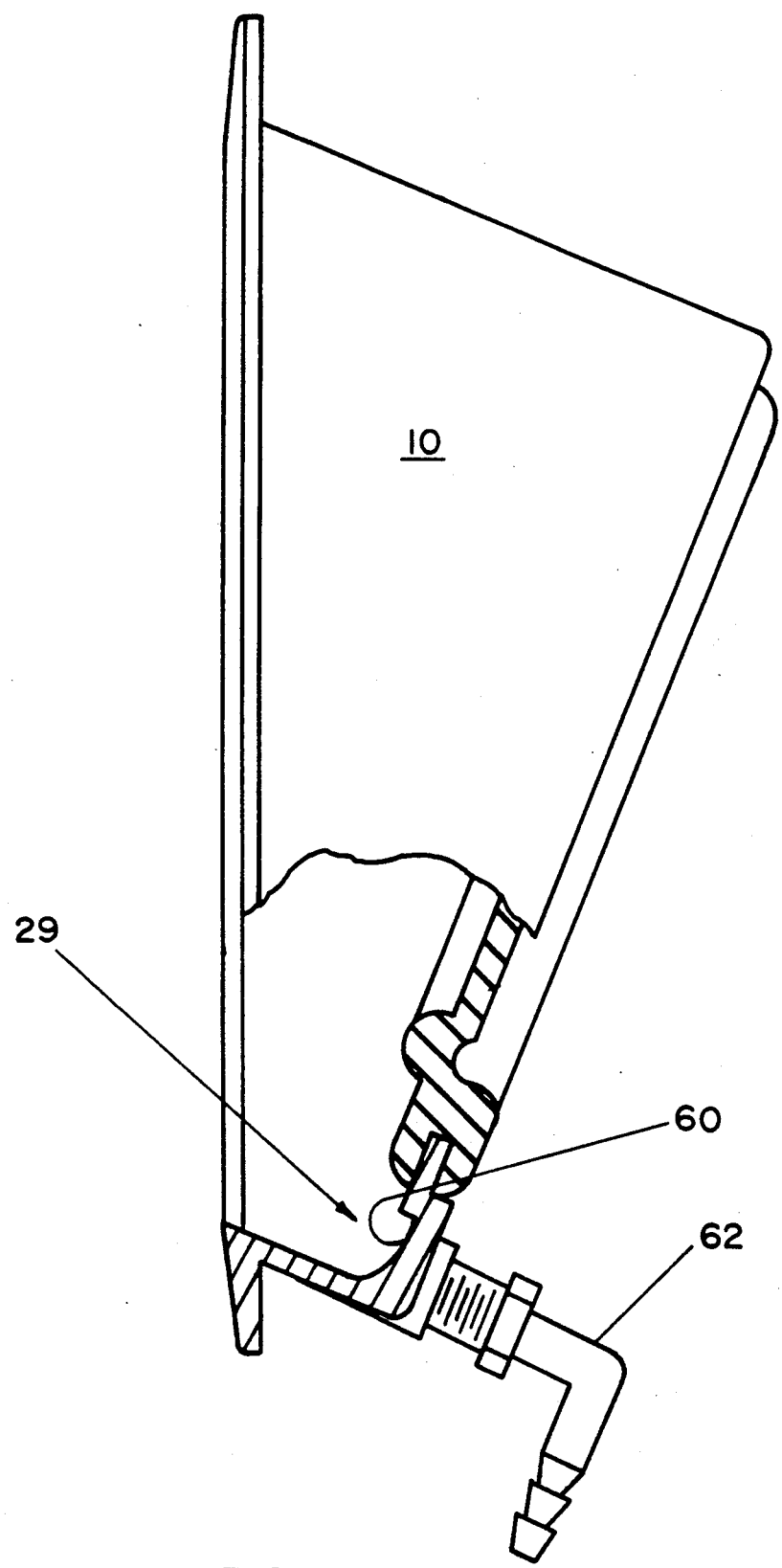
FIG. 4 is a side elevational view, partially in section, of the break-away gas fill guard assembly of FIG. 3 and illustrates the interior lower surface as being angled toward a centrally located drain for drainage of spilled gasoline.
Figure 6:
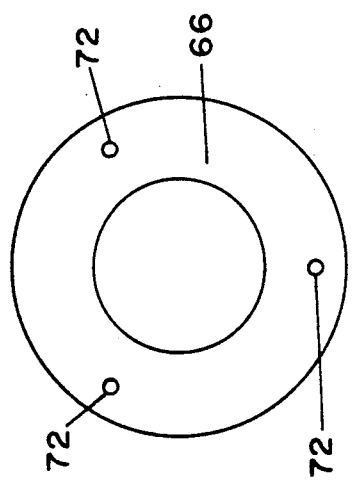
FIG. 6 is an elevational view of a back-up support ring which is used in conjunction with the assembling of the flexible support member of FIG. 5 to the fuel filler pipe of a vehicle.
Figure 8:
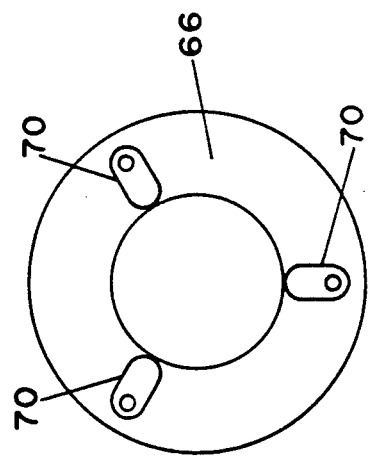
FIG. 8 is a rear elevational view of the back-up support ring of FIGS. 6 and 7.
Figure 7:
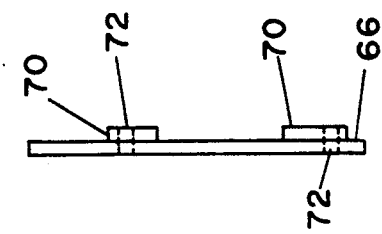
FIG. 7 is a side elevational view of the back-up support ring of FIG. 6.
Figure 5:
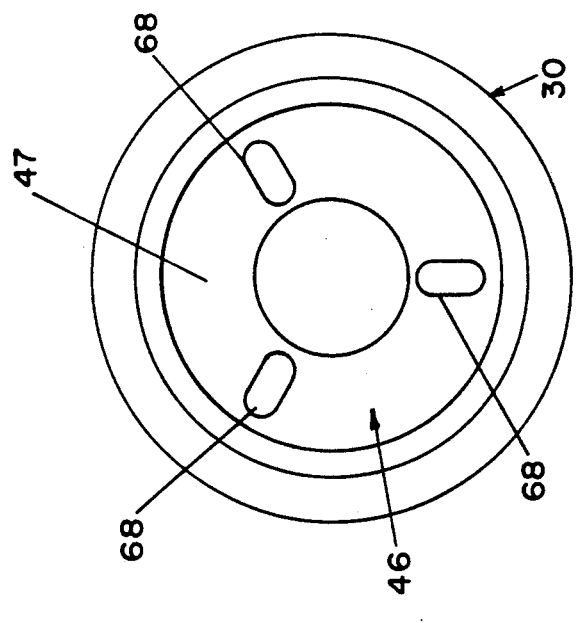
FIG. 5 is an elevational view of the flexible support member of the device of FIG. 3.

FIGS. 3—8 illustrates another embodiment of the present invention wherein like reference numerals refer to like parts. In this embodiment, the lower surface 29 (FIGS. 3 and 4) of flattened portion 26 of the guard assembly lo is provided with a sloped interior surface 60 which drains spilled gas toward a drain connector 62 (FIG. 4) which is secured in a threaded opening 64 of portion 26 disposed substantially equidistant between the side edges (FIG. 3) of the housing. Also, in this embodiment and as shown in FIG. 3, an annular back-up support member or ring 66 is adapted for fitting inside the flexible convolution 42 against the outer surface 47 (FIGS. 3 and 5) of connector disk 46. As seen in FIG. 5 connector disk 46 is provided with spaced indentations 68 to receive protrusions 70 (FIGS. 7 and 8) therein to assist in assembly of the device to connector plate 50. The protrusions mate in the indentations for alignment of fastener holes 72 of the back-up support ring 66 with corresponding fastener holes (not shown) in the connector plate 50. Indentations 68 and protrusions 70 are shown as oblong, however, it is to be understood that they may be of any shape so long as they are capable of mating when assembled. The back-up support ring 66 provides support for the connector disk 46 and also provides a tight seal between the flexible member 30 and the connector plate 50 by maintaining a uniform pressure between the mating surfaces thereof. Additionally, the back-up support ring 66 prevents the fasteners 49 from pulling through the holes made in member 30 by the fasteners 49. Also, the rubber-like material around the holes close and seal against the fasteners 49.

It is to be understood that while the gas fill guard is shown and described as being open the invention should not be so limited since, obviously, the device may be provided with a closure member such as a door or a lid. Such closure member may, if desired, extend over the edges including the curved corners of the gas fill guard.

While the above description constitutes preferred embodiments of the present invention, it will be appreciated that the invention is susceptible to modification, variation and change without departing from the proper scope and fair meaning of the accompanying claims.

I claim:

1. A fuel filler pipe support assembly adapted for attachment to a vehicle having a body portion, a fuel tank and fuel tank filler pipe means, said assembly comprising: a housing having a frame, said frame comprising an outer portion, an intermediate portion extending inwardly from said outer portion and terminating in an inner portion, said housing further comprising a receptacle cup attached to the inner portion of said frame and having a portion extending laterally from said receptacle cup toward the fuel tank of said vehicle; a flexible support member having an enlarged outer peripheral ring, which ring includes radially inner and outer portions and a groove formed in the radially outer portion thereof, said groove receiving said laterally extending portion of said receptacle cup, said flexible support member further including at least one flexible convolution, said convolution having radially inner and outer portions, the radially outer portion of said convolution being integrally connected to the radially inner portion of said peripheral ring, said flexible support member further including a connector disk located approximately in the same plane as said peripheral ring and having radially inner and outer portions, the radially outer portion of said connector disk being integrally connected to the radially inner portion of said convolution, and the radially inner portion of said connector disk forming an opening configured to stretchably receive said fuel tank filler pipe means.

2. An assembly as set forth in claim 1 wherein said connector disk includes a series of spaced apart holes adapted for connection to said filler pipe means.

3. An assembly as set forth in claim 2 wherein said spaced apart holes are configured as oblong slots to accommodate various sizes and configurations of filler pipe means.

4. An assembly as set forth in claim 1 wherein said connector disk is attached to said fuel tank filler pipe by means of a rigid disk shaped connector plate.

5. An assembly as set forth in claim 4 wherein said connector plate is at least one third larger in diameter than the diameter of said fuel tank filler pipe to which it is attached and wherein said connector plate is attached to said connector disk by means of fasteners passing through said holes in said connector disk.

6. An assembly as set forth in claim 1 wherein a fuel drain is provided at the lower most portion of said receptacle cup.

7. An assembly as set forth in claim 6 wherein said fuel drain includes a fitting adapted for reception of a drain line.

8. An assembly as set forth in claim 1 wherein said connector disk includes inner and outer substantially parallel surfaces, said outer surface facing away from said fuel tank and said inner surface facing said fuel tank.

9. An assembly as set forth in claim 8 including support means disposed for mating engagement with said outer surfaces of said connector disk.

10. An assembly as set forth in claim 9 including a rigid disk shaped connector plate secured to said filler pipe, said inner surface of said connector disk disposed for mating engagement with said rigid disk shaped connector plate, and fastener means extending through said support means, said connector disk, and said rigid disk shaped connector plate for secured relation thereof.

11. An assembly as set forth in claim 10 wherein said support means is an annular generally flat member having spaced openings therein and said rigid disk shaped connector plate is provided with like spaced openings, whereby said fastener means extends through said openings for the secured relation of said annular generally flat member, said connector disk and said rigid disk shaped connector plate.

12. An assembly as set forth in claim 11 wherein said annular generally flat member is provided with a plurality of spaced protrusions thereon and said connector disk is provided with a plurality of similarly spaced indentions thereon to receive said spaced protrusions therein for aligned relation of said openings of said connector disk and said rigid disk shaped connector plate.

13. An assembly as set forth in claim 12 wherein said receptacle cup is provided with a lower surface and wherein drainage means is provided at said lower surface.

14. An assembly as set forth in claim 13 wherein said lower surface is disposed in downwardly sloped relation with said inner portion to define said drainage means.

15. An assembly as set forth in claim 14 wherein said drainage means is defined by an opening disposed in said lower surface, said lower surface being disposed in sloped relation toward said opening.

* * * * *